(12) United States Patent
Spencer

(10) Patent No.: US 11,596,143 B2
(45) Date of Patent: Mar. 7, 2023

(54) OUTDOOR LONG-TERM STORAGE ENCLOSURE

(71) Applicant: Xtaris LLC, Oakland Township, MI (US)

(72) Inventor: Benjamin R. Spencer, Oakland Township, MI (US)

(73) Assignee: Xtaris LLC, Oakland Township, MI (US)

( * ) Notice: Subject to any disclaimer, the term of this patent is extended or adjusted under 35 U.S.C. 154(b) by 510 days.

(21) Appl. No.: 16/695,893

(22) Filed: Nov. 26, 2019

(65) Prior Publication Data

US 2021/0153497 A1    May 27, 2021

(51) Int. Cl.
| | |
|---|---|
| *B65D 25/22* | (2006.01) |
| *A01M 31/00* | (2006.01) |
| *B65D 25/10* | (2006.01) |
| *B65D 25/28* | (2006.01) |
| *A45C 13/00* | (2006.01) |

(Continued)

(52) U.S. Cl.
CPC ............... *A01M 31/00* (2013.01); *A45C 5/00* (2013.01); *A45C 13/005* (2013.01); *A45C 13/008* (2013.01); *A45C 13/34* (2013.01); *B65D 25/108* (2013.01); *B65D 25/22* (2013.01); *B65D 25/2805* (2013.01); *A45C 15/06* (2013.01); *A45C 2013/026* (2013.01)

(58) Field of Classification Search
CPC . A01M 31/00; B65D 25/108; B65D 25/2805; B65D 25/22; A45C 13/34; A45C 2013/026; A45C 13/005; A45C 13/008; A45C 15/06; A45C 5/00; F41C 33/06; F42B 39/007; F41B 5/1457; E05D 11/1028

USPC .......................................... 206/317; 224/584
See application file for complete search history.

(56) References Cited

U.S. PATENT DOCUMENTS

| | | | |
|---|---|---|---|
| 6,250,470 B1 | 6/2001 | Mackenzie | |
| 6,254,251 B1 * | 7/2001 | Washington | ........... A45C 15/06 362/234 |

(Continued)

OTHER PUBLICATIONS https://www.mekcooutdoors.com/shop/timber-locker Downloaded Mar. 4, 2020.

(Continued)

*Primary Examiner* — Nathan J Newhouse
*Assistant Examiner* — Matthew T Theis
(74) *Attorney, Agent, or Firm* — Warner Norcross + Judd LLP

(57) ABSTRACT

A long-term outdoor storage container is provided to store items at a wildlife or game observation or hunting location, optionally adjacent a treestand or other elevated platform. The storage container can include a closure panel hingedly secured to a housing having integral legs that stabilize and/or space the container relative to a tree or other support, latches to securely close the panel relative to the housing, optionally in a waterproof sealed manner, an insert in an internal compartment of the container to stow items therein, and retention strap flanges to retain a retention strap that secures the container to a tree. The container can include flanges or loops to accommodate a lock and cable, thereby securing the container against theft. The container can include a display to display time, temperature, barometric pressure and other information.

4 Claims, 12 Drawing Sheets

(51) Int. Cl.
*A45C 5/00* (2006.01)
*A45C 13/34* (2006.01)
*A45C 15/06* (2006.01)
*A45C 13/02* (2006.01)

(56) References Cited

U.S. PATENT DOCUMENTS

| | | | |
|---|---|---|---|
| 6,273,773 B1 | 8/2001 | Bourke | |
| 6,471,054 B2 | 10/2002 | Nevarez | |
| 6,530,123 B1 | 3/2003 | Wahlstedt | |
| 6,948,599 B2 | 9/2005 | Rodrigue et al. | |
| 8,047,413 B2 | 11/2011 | Arajakis | |
| 8,397,310 B2* | 3/2013 | Parris | A45C 15/00 340/539.22 |
| RE44,568 E | 11/2013 | Stepp | |
| 8,701,912 B2 | 4/2014 | Carnevali et al. | |
| 8,752,745 B2 | 6/2014 | Bond et al. | |
| 8,794,382 B2 | 8/2014 | Hugher | |
| 2008/0047859 A1 | 2/2008 | Dillard et al. | |
| 2011/0147386 A1* | 6/2011 | Whalen | A45C 5/03 220/324 |
| 2012/0000949 A1 | 1/2012 | Williams, Jr. | |
| 2013/0237328 A1* | 9/2013 | Billings | F16D 7/002 464/37 |
| 2014/0291327 A1 | 10/2014 | Messerschmidt | |
| 2016/0166029 A1* | 6/2016 | Bridgeforth | A45C 13/04 190/122 |
| 2017/0127783 A1* | 5/2017 | Korey | H02J 7/0045 |
| 2018/0027954 A1* | 2/2018 | Schneider | F41C 33/06 |
| 2018/0354687 A1* | 12/2018 | Seiders | B65D 43/165 |

OTHER PUBLICATIONS

TreeLocker [online]. Keyes Hunting Gear, LLC. Retrieved from the Internet on Oct. 11, 2019 <https://keyeshuntinggear.com/products/keyes-tree-locker-backpack>.
Eberlestock G29 Tailhook Hunting Backpack [online]. BlackOvis. Retrieved from the Internet on Oct. 11, 2019<https://www.blackovis.com/eberlestock-g29-tailhook-hunting-backpack>.
The Badlands Tree Stand [online]. Badlands. Retrieved from the Internet on Oct. 11, 2019 <http://www.badlandspacks.com/the-badlands-tree-stand/>.
'Product Review: StandBack by GamePlan Gear'. In Ike's Outdoors (Bow reviews, product reviews, how-to videos, & more) [online]. Aug. 19, 2009. Retrieved from the Internet on Oct. 11, 2019 <http://www.ikesoutdoors.com/archives/product-review-standback-by-gameplan-gear>.
'Gameplan Gear Bowbat'. In Saddle Hunter [online]. Jul. 7, 2018. Retrieved from the Internet on Oct. 11, 2019<https://saddlehunter.com/community/index.php?threads/gameplan-gear-bowbat.7208/>.
A-25 Game Camera [online] Moultrie. Retrieved from the Internet on Oct. 11, 2019<https://www.moultriefeeders.com/a-25-game-camera>.
Hynes, Randy. 'Badlands Treestand Pack Review'. In 365 Whitetail [online]. Oct. 15, 2012. Retrieved from the Internet on Oct. 11, 2019 <http://www.365whitetail.com/badlands-treestand-pack-review/>.

* cited by examiner

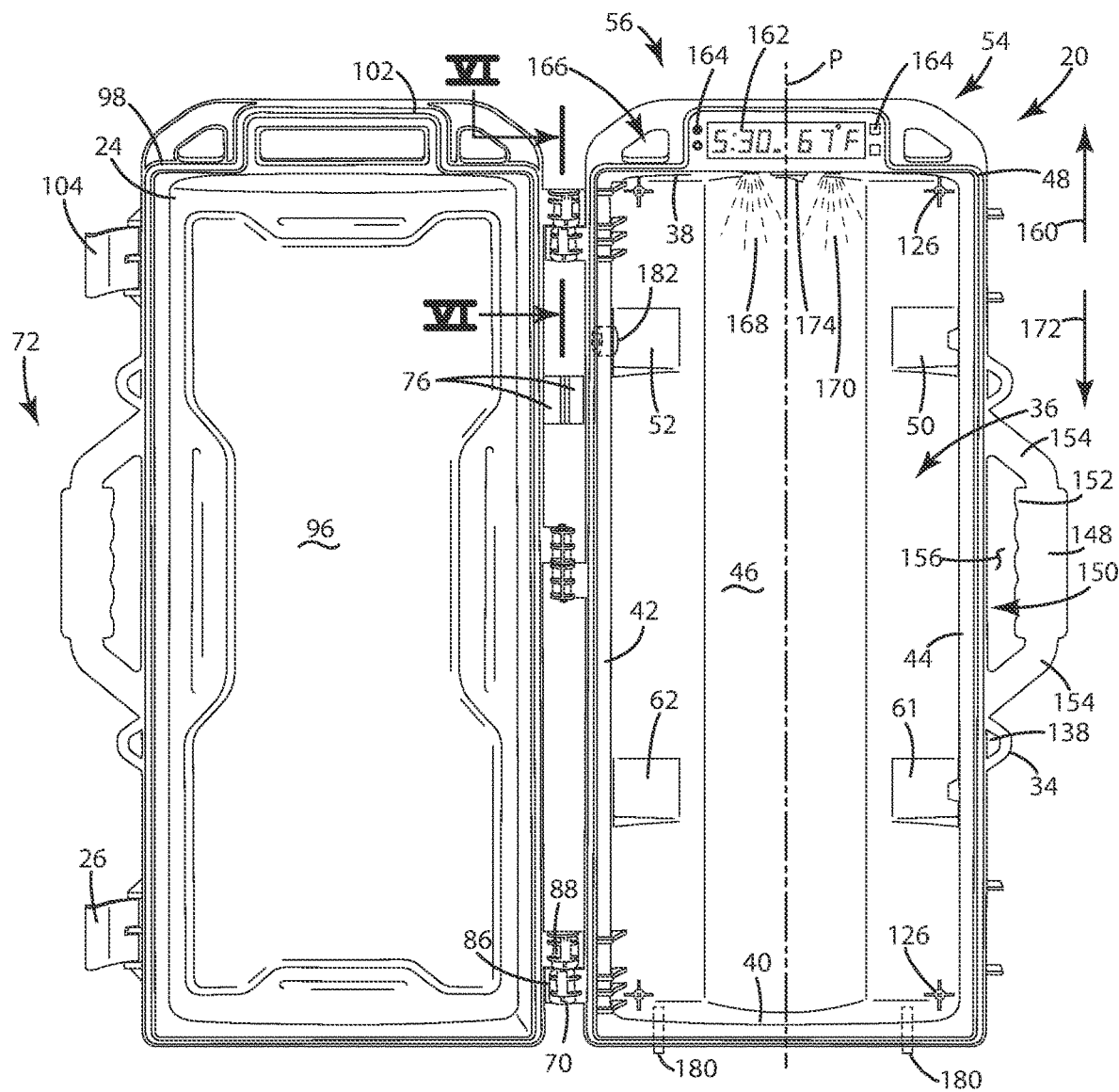
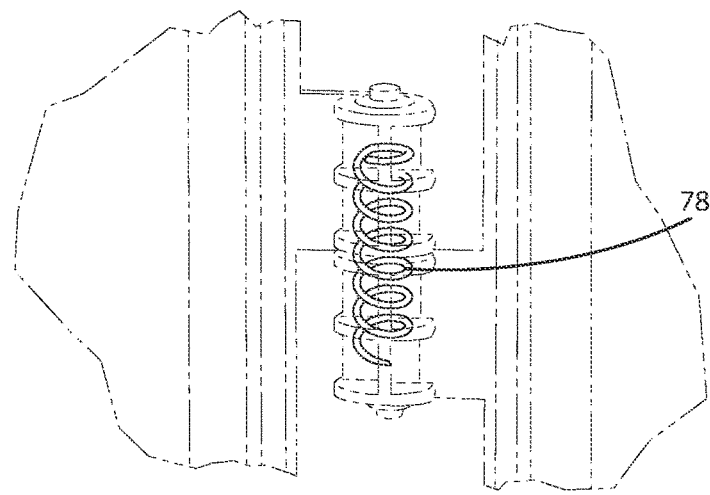
Fig. 4
Fig. 5

OUTDOOR LONG-TERM STORAGE ENCLOSURE

BACKGROUND OF THE INVENTION

The present invention relates to outdoor products, and more particularly to a long-term storage enclosure configured to mount to a tree or other object in the environment.

A variety of outdoor activities are conducted in remote areas. Some such activities are wildlife watching or hunting, where individuals sometimes trek a long distance into the wilderness or away from human activity to view or pursue wildlife living in those remote areas. In a hunting scenario, a hunter may carry a backpack loaded with, gear and other equipment, to a remote location. There, they may set up a treestand, high in a tree, with steps leading from the ground to the treestand. The hunter also will typically haul their gear, for example, binoculars, rangefinders, wind checkers, tools, grunt calls, rattle bag, bleat can, scents, hand warmers, flashlight, knife, spare batteries, and extra ammunition, up to the treestand in the backpack. The hunter can use these items during the hunt, retrieving them from the backpack, which can be accessed multiple times for this purpose. After hunting in the treestand, the hunter usually will carry their backpack loaded with the gear back to their vehicle, hauling it out and then back in the next time they sit in the treestand.

Where the hunter will sit in the same treestand in a remote location multiple times over a period, all this transport of their gear can become burdensome, and can make navigating terrain a bit more difficult. There also is the risk of making noise trying to carry all the gear back and forth and/or accidently forgetting a key item back at camp or even dropping it on the trek to a stand. Therefore, some hunters will leave their backpack up in the tree, near their treestand, particularly when the hunter will return the next day. This can present issues in inclement weather, during which the backpack and associated gear may get wet. If the backpack is not waterproof, electronics can be damaged, or mold can grow, both of which can be costly problems or can ruin a hunt. In addition, if inquisitive animals such as raccoons, squirrels or the like, smell something on or in the backpack, they can sometimes get into it or destroy the backpack and its contents. Further, although the hunting location may be remote, others may come across the treestand and remove the backpack with all its valuable gear from the site. All of the above can be extremely frustrating to the hunter when climbing into this treestand, usually in the dark, only to find their gear damaged, partially missing or completely gone.

Accordingly, there remains room for improvement in the field of outdoor storage containers to adequately protect gear and equipment stored at remote hunting or wildlife watching sites, so that a user need not repeatedly haul those items back and forth to the sites.

SUMMARY OF THE INVENTION

A long-term outdoor storage container is provided to store gear, equipment and other items at a wildlife or game observation or hunting location, optionally adjacent a treestand or other elevated platform.

In one embodiment, the storage container can include a closure panel hingedly secured to a housing having integral legs that stabilize and/or space the container relative to a tree or other support. The closure panel and housing can be constructed from a rigid, optionally polymeric, material and can be waterproof. The closure and housing thus can protect against intrusion or breach of the container by animals, and generally can keep contents dry.

In another embodiment, the storage container can include latches to securely close the panel relative to the housing, optionally in a waterproof sealed manner. The latches can be of a folding or pivoting type. The latches can be effortlessly and quietly engaged and disengaged to latch the closure panel in a closed mode, or to open the closure panel to an open mode so that an internal compartment of the housing can be accessed.

In still another embodiment, the storage container can include the housing having an upper wall, a lower wall, first and second side walls, and a rear wall, cooperatively forming an internal compartment which can be closed via the closure panel. An insert can be placed in the internal compartment of the container to stow items therein. The insert can be removable from the container, and can include multiple pockets to stow items therein. The insert can be coated with a noise dampening material, such as a polymer, a natural or synthetic rubber, and/or a silicone), to reduce noise between gear and the plastic housing. The pockets can be mesh so that items can be seen through the mesh and viewed in the pockets, and optionally can include elastic tops of pockets to secure gear from falling out despite the angle of the vertical structure.

In yet another embodiment, the housing can include retention strap flanges to retain a retention strap that secures the container to a tree. The retention strap flanges can be integral with the rear wall or other parts of the housing.

In even another embodiment, the container can include flanges or loops to accommodate a lock and cable. The lock can fit through apertures in a lock flange to lock the closure panel in the closed mode relative to the housing. The cable can fit through apertures in a cable flange, and around a tree. The cable can be locked at opposing ends, in some cases with the lock, to secure the container to a generally vertical support, which includes a tree, a pole, a post, or another elongated generally vertical object or structure.

In a further embodiment, the container can include lift rope openings that can accommodate a lift rope to enable a user to pull the container up into an elevated platform, generally in an upright position to keep gear in place. The openings can be disposed above the housing, and above the upper wall.

In still a further embodiment, the legs mentioned above can include foam feet, which can assist in stabilizing the container relative to the generally vertical support.

In yet a further embodiment, the container can include an illumination source in communication with the internal compartment. The illumination source can project illumination into the internal compartment, downward toward the plurality of pockets of the storage insert. The illumination can be of a certain wavelength so as to not spook game. The illumination can free a user from having to hold a secondary light to view contents of the container in the dark.

In even a further embodiment, the container can include a display joined with the housing and visible adjacent at least one of the upper wall, the lower wall, the first side wall, and the second side wall. The display can be disposed outside the internal compartment. The display can be in communication with a power source and configured to display at least one of time, temperature, wind direction and barometric pressure to a user while the closure panel is in the open and/or closed modes. This can enable a user to quietly view information without extra movement to retrieve a phone or other electronic device.

In another, further embodiment, the storage container can include a static or folding handle integrally formed with or hinged to and extending from at least one of the closure panel and the housing. The handle can define a hand aperture through which a hand can be place, a grip surface adjacent the hand aperture, and opposing connection supports projecting from the at least one of a closure panel and the housing. The handle can facilitate carrying of the container in a generally horizontal orientation while the container is closed.

In yet a further embodiment, the storage container can include an arrow or bolt gripper that is joined with the housing or panel. The gripper can hold one or more bolts or arrows for a quick, one-handed retrieval of the same for a follow-up shot on game.

The current embodiments of the storage container provide a secure, long-term, weatherproof enclosure for hunters, wildlife watchers and other outdoorsman to store gear, equipment and other items at a remote location. Thus, the user need not haul those items to and from a particular location, and can generally rest assured that their valuables will be where they left them. The container also can offer consistent, quiet access to items stored therein, and access to information, thereby reducing the likelihood of spooking game.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

BRIEF DESCRIPTION OF THE DRAWINGS

FIG. 4 is a front view of the outdoor storage container in the open mode;

FIG. 5 is a close up of a biasing hold open element;

DESCRIPTION OF THE CURRENT EMBODIMENTS

Figure 1:
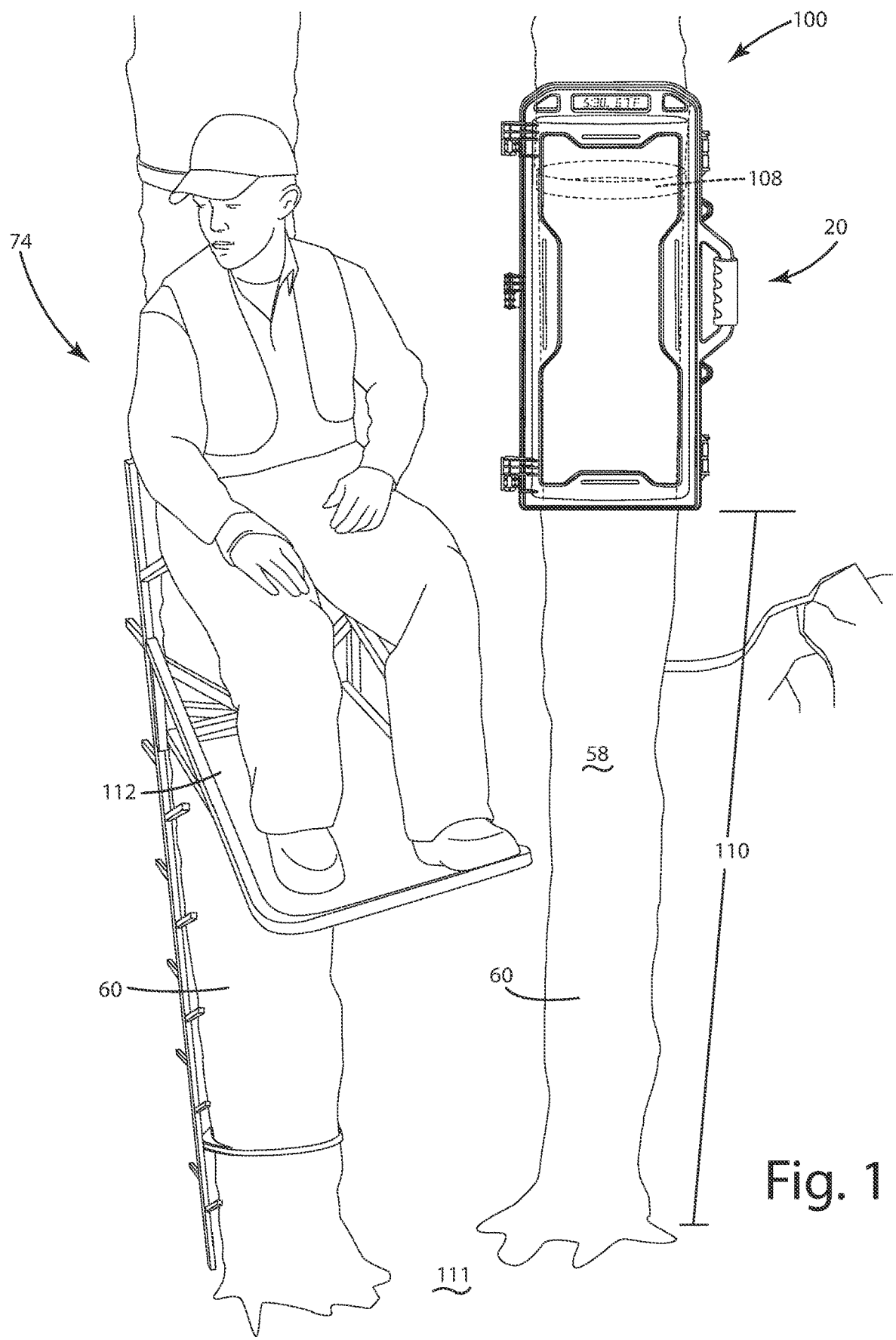
FIG. 1 is an environmental view of an outdoor storage container of a current embodiment in a closed mode.

A current embodiment of the outdoor storage container (alternatively referred to as a storage container) is illustrated in FIGS. 1-11, and generally designated 20. The outdoor storage container 20 can include a housing 22, a closure panel 24, a first latch 26, a first retention strap holder 28, a storage insert 30, a cable flange 32 and a lock flange 34.

The housing 22 can be constructed from a rigid polymeric material and can define an internal compartment 36. The internal compartment 36 can be bounded by an upper wall 38, a lower wall 40, a first side wall 42, a second side wall 44, and a rear wall 46. The upper wall 38, lower wall 40, first side wall 42, and second side wall 44 can be contiguous and form a monolithic structure. Each of the upper 38, lower 40, and side 42, 44 walls can include a portion of a first sealing flange 48 extending around the internal compartment 36. The rear wall 46 includes a first outwardly extending leg 50 and a second outwardly extending leg 52, each disposed on opposite sides of a bisecting plane P or longitudinal axis that divides the housing 22 into a first side portion 54 and a second side portion 56.

Figures 15, 16:
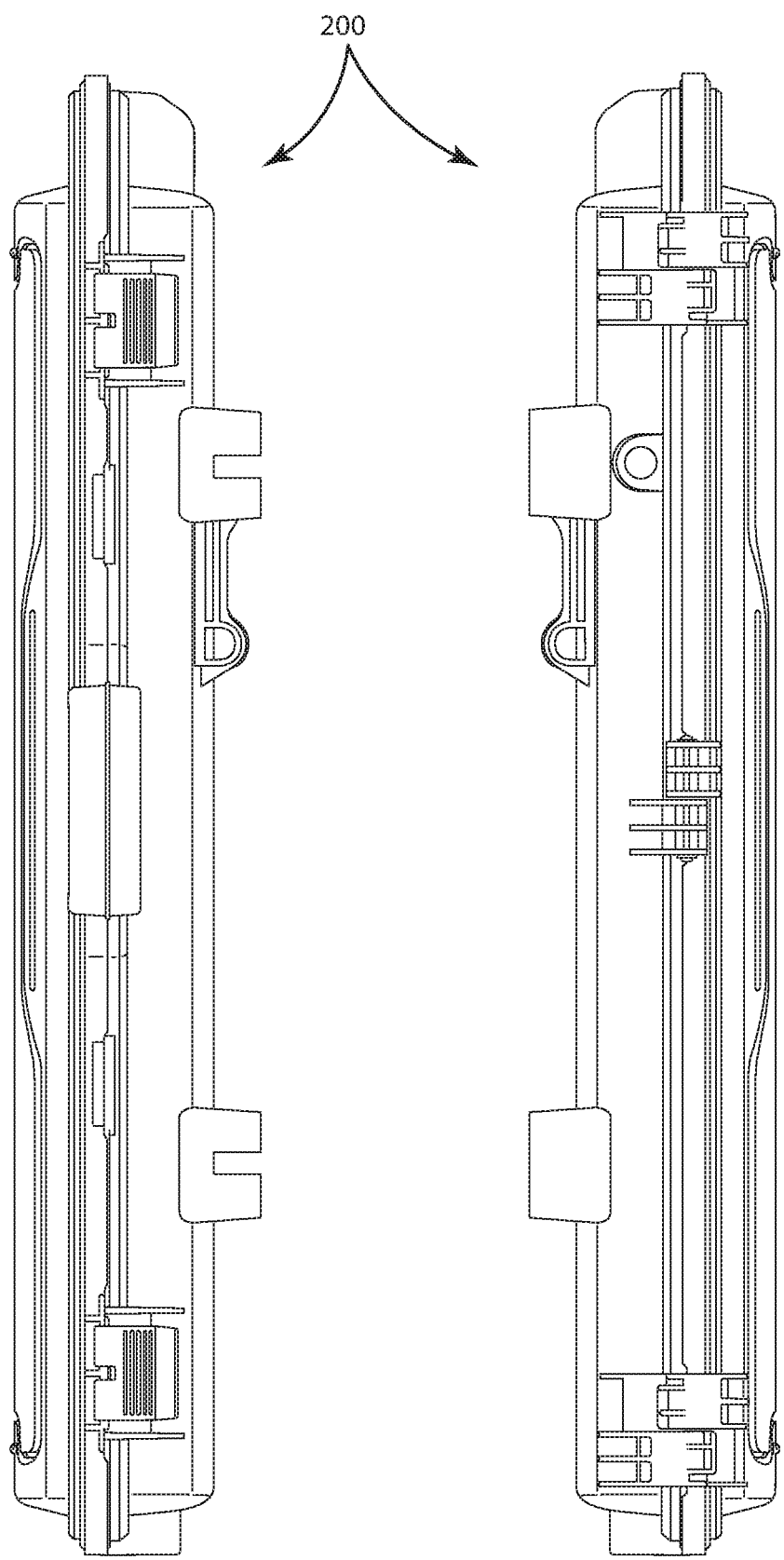
FIG. 15 is a right side view thereof.
FIG. 16 is a left side view thereof.

The first outwardly extending leg 50 and the second outwardly extending leg 52 can be each configured to engage an exterior 58 of a generally vertical support 60, which can be somewhat cylindrical and/or rounded, and to selectively hold the rear wall 46 at a distance away from the generally vertical support 60. Non-limiting examples of the generally vertical support 60 include tree trunks, or poles (such as wooden or metallic poles, telephone poles or power poles), as well as other generally vertical structures, whether or not having cylindrical, round, polygonal, or other cross sections or shapes. The external geometry of the generally vertical support 60 is capable of being effectively engaged by legs 50, 52 of the housing 22 to support the outdoor storage container 20 at an elevation 110. For example, the support 60 can have an elliptical cross-section or may include a rectangular cross section of appropriate dimension to be engaged by the legs 50, 52 at separate locations distant from one another. The distance away that the legs hold the remainder of the storage container 20 from the vertical support can be a maximum distance maintained between the generally vertical support 60 and the rear wall 46. The distance D1 away, shown in FIG. 15, is optionally between 0 and 4 inches, inclusive, between 0.25 and 2 inches, inclusive, or between 0.5 and 1.5 inches, inclusive.

Figure 3:
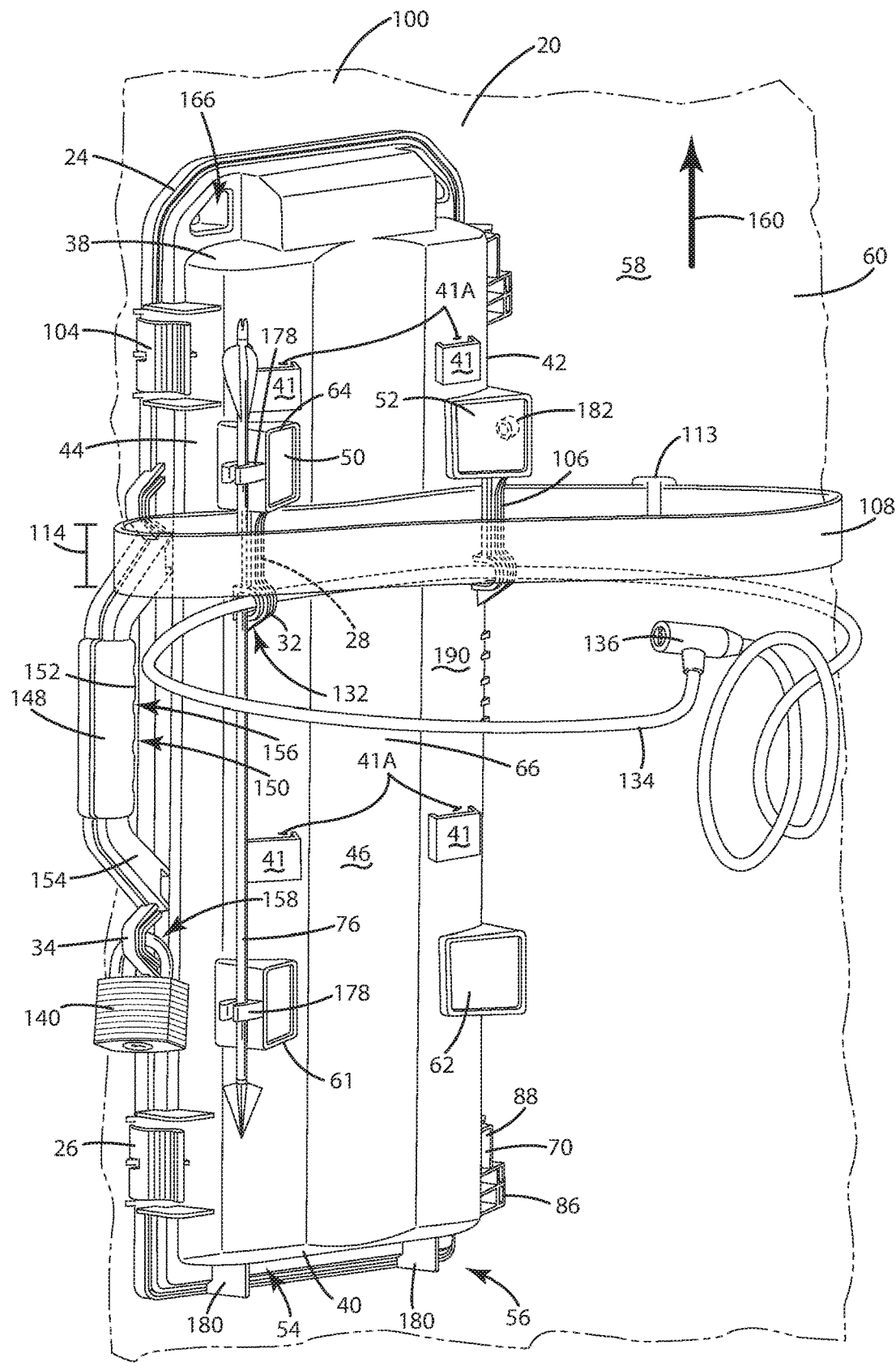
FIG. 3 is a rear perspective view of the outdoor storage container in the closed mode.
Figure 11:
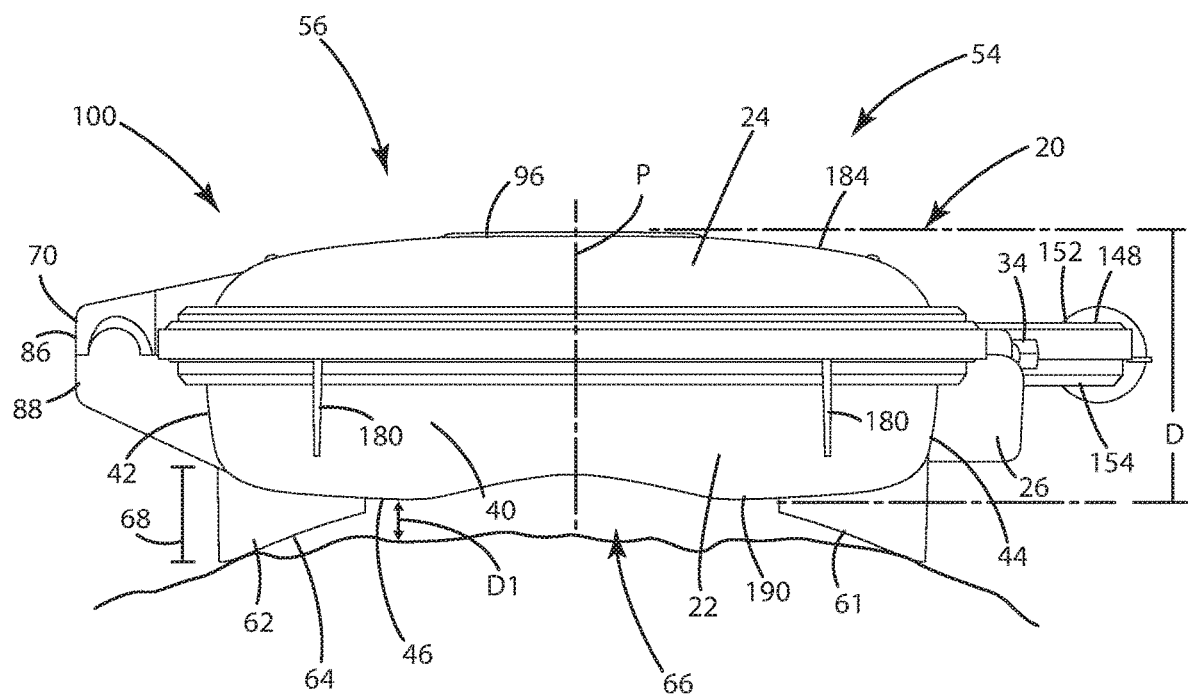
FIG. 11 is a top view of the outdoor storage container in a closed mode.
Figure 12:
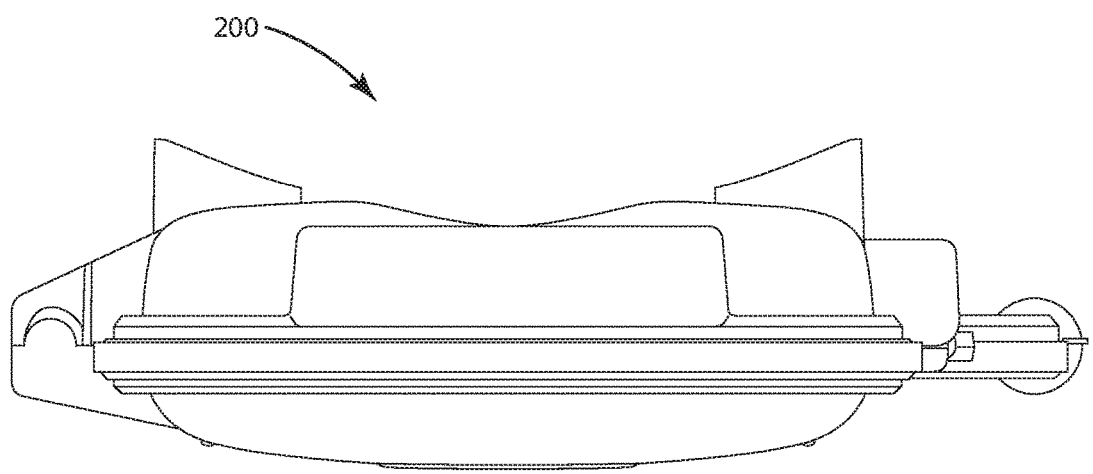
FIG. 12 is a top view of a first alternative embodiment of the outdoor storage container.
Figure 13:
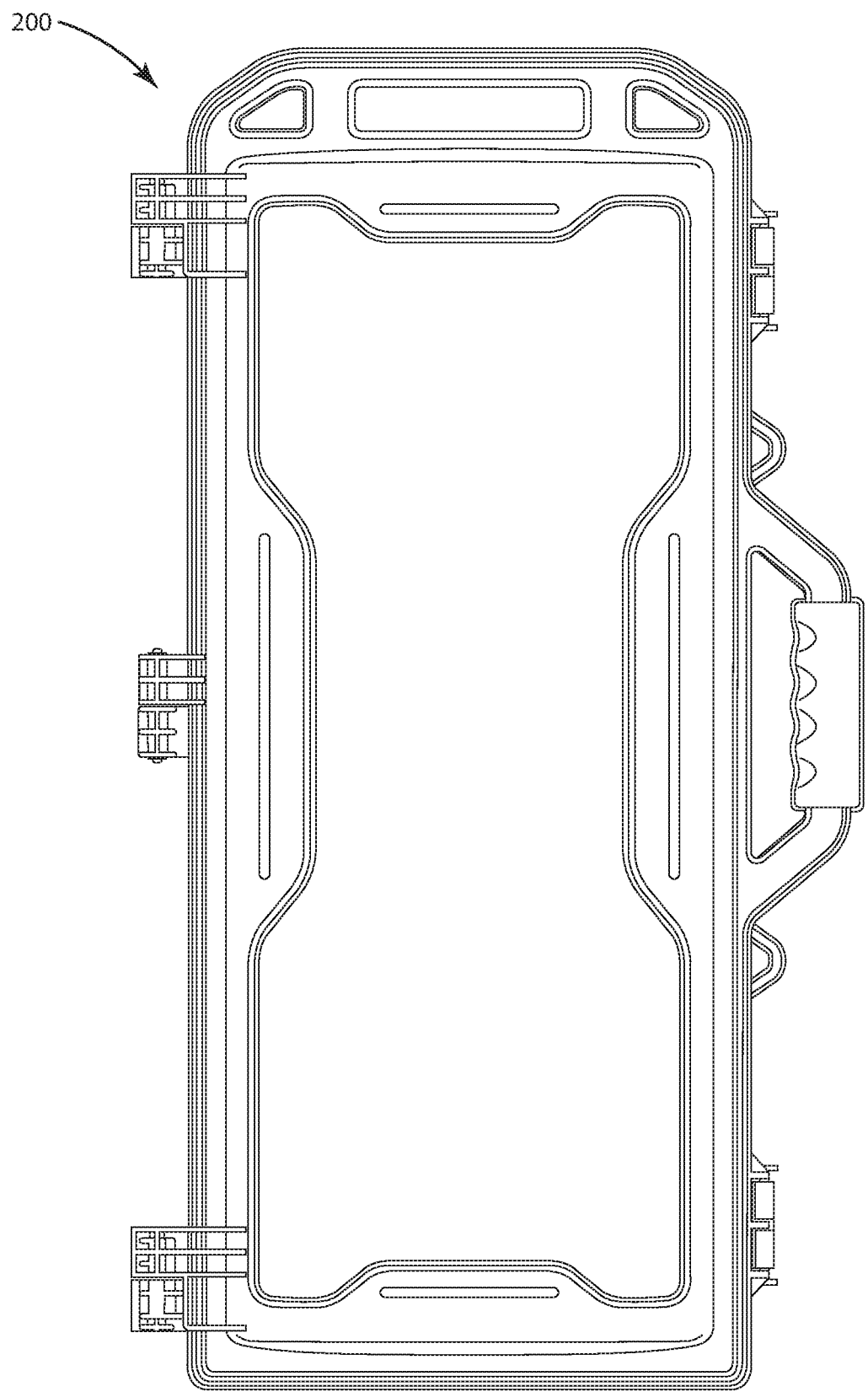
FIG. 13 is a front view thereof.
Figure 14:
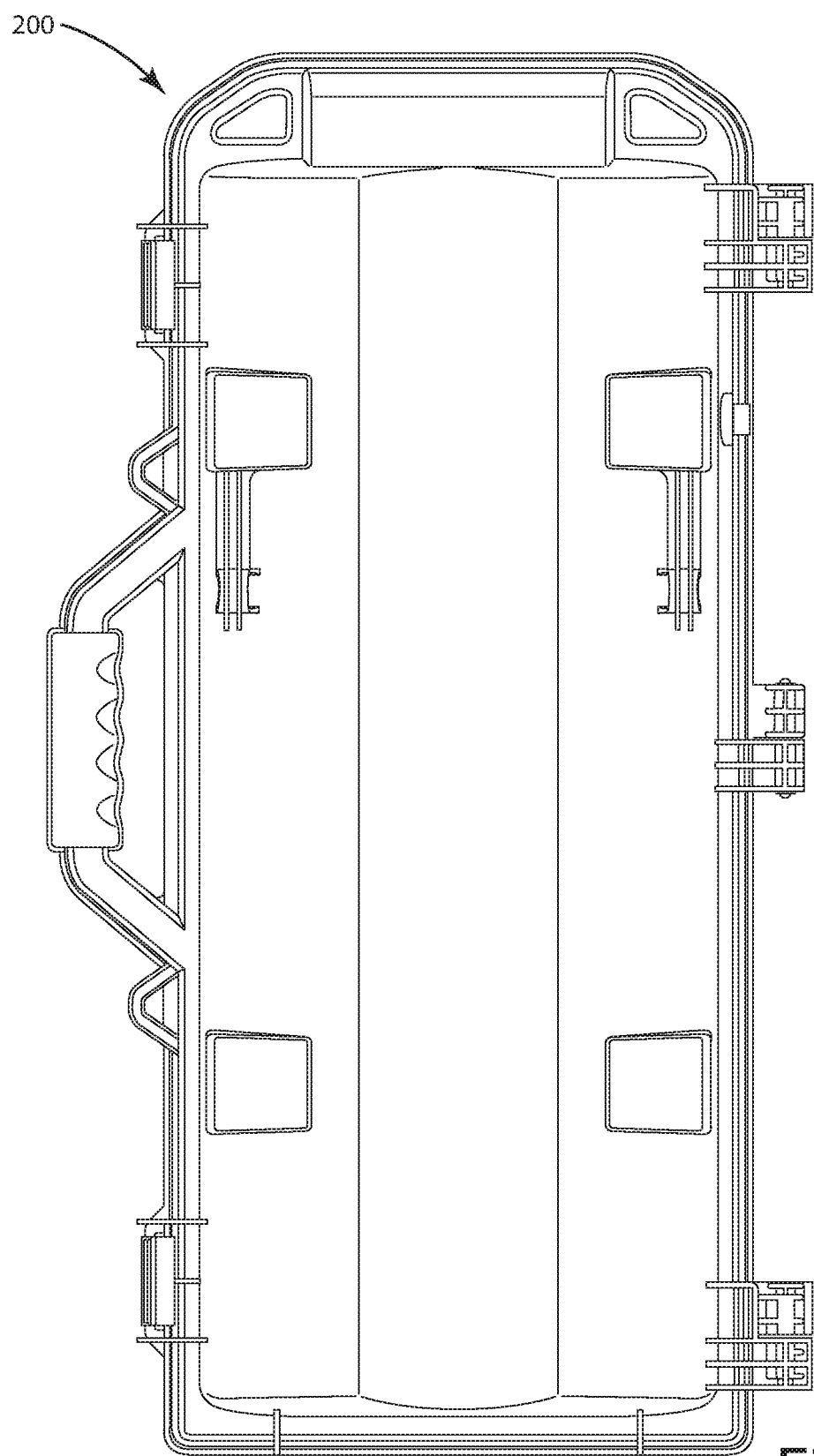
FIG. 14 is a rear view of thereof.

As depicted in FIGS. 3 and 11, the first outwardly extending leg 50 and the second outwardly extending leg 52 can define a geometry appropriate for engaging an exterior surface 58 of a generally vertical support 60. In various embodiments, each outwardly extending leg 50, 52 has a generally similar geometry, therefore the first outwardly extending leg 50 will be described in further detail but such description will be understood to apply to all outwardly extending legs 50, 52. In various embodiments, the rear wall includes additional outwardly extending legs; for example, the rear wall may include a third outwardly extending leg 61 disposed on the first side portion 54, and a fourth outwardly extending leg 62 disposed on the second side portion 56 as depicted in FIG. 3. The third outwardly extending leg 61 can be located below the first outwardly extending leg 50 and the fourth outwardly extending leg 62 can be located below the second outwardly extending leg 52. In various embodiments, the first outwardly extending leg 50 can define a curvature or angle that generally conforms to a contour of the exterior surface 58 of the generally vertical support 60 (e.g., an arcuate curvature). The first outwardly extending leg 50 can define steps or serrations facilitating mechanical engagement with the exterior surface 58; for example, the bark of a tree trunk.

Optionally, the first outwardly extending leg 50 can include protrusions, spikes, or burrs extending from a surface 64 of the first outwardly extending leg 50 that allow for physical engagement of the exterior surface 58 and/or the first outwardly extending leg 50 can include surface treatments or may be at least partially manufactured of a material, such as a natural or synthetic rubber or a foam, capable of at least partially enhancing frictional engagement between the surface 64 of the first outwardly extending leg 50 and the exterior surface 58 of the generally vertical support 58. The first outwardly extending leg 50 can include a heterogeneous material construction (for example, a combination of metallic and polymeric components) wherein, as a non-limiting example, the protrusions, spokes, or burrs may be manufactured of a material that is different from a material from which the housing 22 is manufactured or from a material from which various other portions of the first outwardly extending leg 50 are manufactured. The first outwardly extending leg 50 can include foam feet to assist in stabilizing the storage container 20 relative to the generally vertical support 60.

Optionally, the rear wall 46 can define a generally concave recess 66 along an axis of the housing 22 running from the upper wall 38 to the lower wall 40 and disposed between the first outwardly extending leg 50 and the second outwardly extending leg 52. The concave recess 66 is so shaped as to allow for effective physical engagement of the exterior surface 58 of the generally vertical support 60 by the first outwardly extending leg 50 and the second outwardly extending leg 52 while minimizing a distance 68 that the first outwardly extending leg 50 and the second outwardly extending leg 52 must extend from the rear wall 46 to effectively engage the exterior surface 58. The concave recess 66 assists in preventing the rear wall 46 from obstructing contact between the outwardly extending legs 50, 51 and the generally vertical support 60. The concave recess 66 may be arched, rectangular, or polygonal in cross-section. In various embodiments, the distance 68 can be from 1 inch to 5 inches, inclusive, from 1 inch to 4 inches, inclusive, or from 0.5 inches to 3 inches, inclusive.

Figure 6:
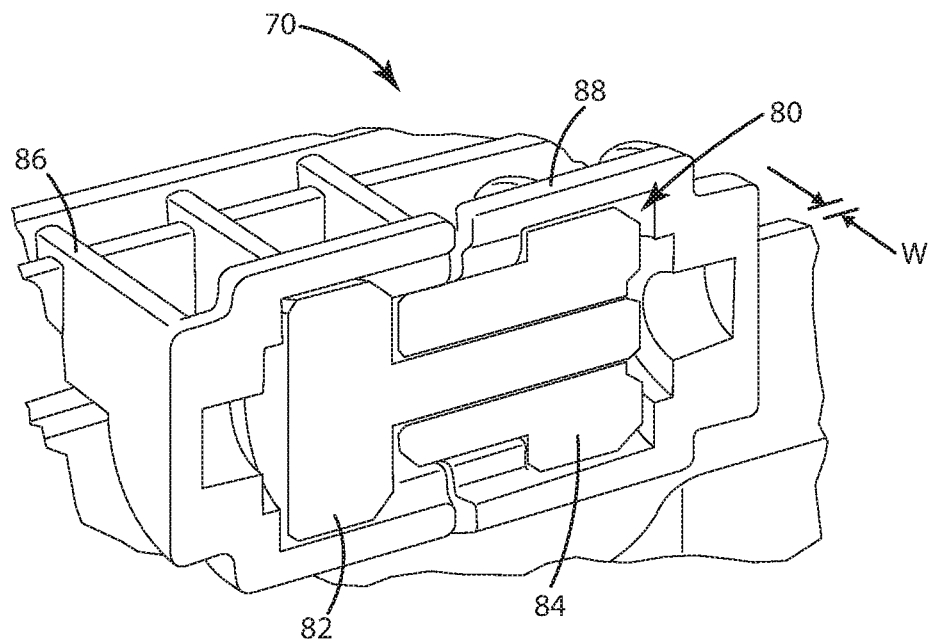
FIG. 6 is a partial section view of a first hub and a second hub of a hold open element.
Figure 7:
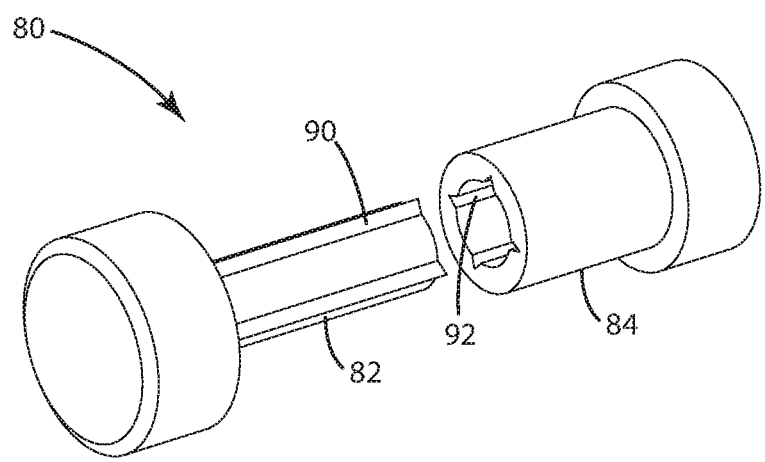
FIG. 7 is an exploded view of a first hub and a second hub of a hold open element.

With reference to FIGS. 3-4, the closure panel 24 can be secured to the housing 22 with a first hinge 70 disposed on the first side portion 54. The first hinge 70 can be constructed from a rigid polymeric material. In various embodiments, the first hinge 70 includes a hold open element, as shown in FIGS. 4-6 for maintaining the outdoor storage container in an open mode 72. The hold open element can be joined with the closure panel 24 and can urge or generally maintain the closure panel 24 to the open mode 72, such that the storage insert 30 is accessible by a user 74. The hold open element is operable in a hold open mode in which the hold open element causes the first hinge 70 to exert a force on the closure panel 24 to selectively retain the closure panel 24 in an open mode 72 such that the internal compartment 36 is accessible to the user 74. In the open mode 72 the closure panel 24 and the housing 22 are disposed at an angle to one another, optionally between 0° and 180°, inclusive, between 180° and 90°, inclusive, between 180° and 135°, inclusive, or between 180° and 150°, inclusive. Optionally, the hold open element can be a magnetic element comprising magnets 76 (FIG. 4), or a biasing element such as a spring 78 (FIG. 5). The first hinge 70 can be of various forms, such as a pivot hinge, a barrel hinge, or a spring hinge.

In some embodiments, the hold open element can be a torque element 80, as shown in FIGS. 5-6. Suitable torque elements 80 are described in U.S. Pat. No. 6,530,123 and U.S. Patent Application 2013/0237328, the disclosures of which are incorporated herein by reference. The torque element 80 can form part of the first hinge 70, as shown in FIG. 5. In general, the torque element 80 can comprise a first hub 82 and a second hub 84. In some embodiments the first hub 82 is secured to a first half 86 of the first hinge 70 and the second hub 84 is secured to a second half 88 of the first hinge 70. The first hub 82 is generally cylindrical in shape. The first hub 82 can include a plurality of ridges or protrusions 90, as shown in FIG. 6. There, the first hub 82 is rotatably disposed inside the second hub 84 such that the protrusions 90 can be received within complimentary grooves 92 such that the protrusions 90 and grooves 92 function in combination to bias the first hinge 70 in a particular angular configuration. The ridges 90 and grooves 92 are internestable within one another. When the first hub 82 is rotated within the second hub 84 so that the protrusions 90 do not align with the grooves 92, the protrusions 90 cause the first hub 82 to establish a friction torque with the second hub 84. In various embodiments, the hold open element can maintain the outdoor storage container in an open mode 72 when the closure panel 24 is subjected to winds of optionally at least 10 mph, 25 mph, or 30 mph blowing directly on the closure panel 24. In some embodiments, the hold open element can dampen closure of the outdoor storage container 20 so as to prevent noise that may otherwise be produced by closing the outdoor storage container 20 too quickly.

The closure panel 24 can be constructed from a rigid polymeric material. With reference to FIGS. 4 and 9-11, the closure panel 24 can include a front wall 96 and a second sealing flange 98 configured to be placed adjacent the first sealing flange 48 when the closure panel 24 is in a closed mode 100. The front wall 96 optionally forms a shape optimized to increase a volume of the internal compartment 36; for example, the front wall 96 may define a convex (as in FIG. 11), planar, or polygonal shape.

A seal 102 can be interposed between the first sealing flange 48 and the second sealing flange 98 so that a waterproof seal is disposed around the internal compartment 36 in the closed mode 100. As used herein "waterproof seal" is understood to mean that the seal 102 in combination with the first sealing flange 48 and the second sealing flange 98 in the closed mode 100 functions to prevent water from entering the internal compartment 36; for example, during a rainstorm or when the outdoor storage container 20 is dropped in a body of water. Optionally, the seal 102 can be a rubber o-ring or silicone gasket that extends around one or more of the flanges, which can include a groove to receive at least a portion of the o-ring or gasket. In various embodiments, the outdoor storage container 20 in the closed mode 100 is water resistant for light rain and spray (IP64, where IP stands for "Ingress Protection"), is water resistant for foul weather and spray proof (IP65), will float and can handle quick submersion (IP66), is submersible to depths of up to 1 m for 30 minutes (IP67), and/or is submersible to depths of up to 6 m for 60 minutes (IP68).

Figure 10:
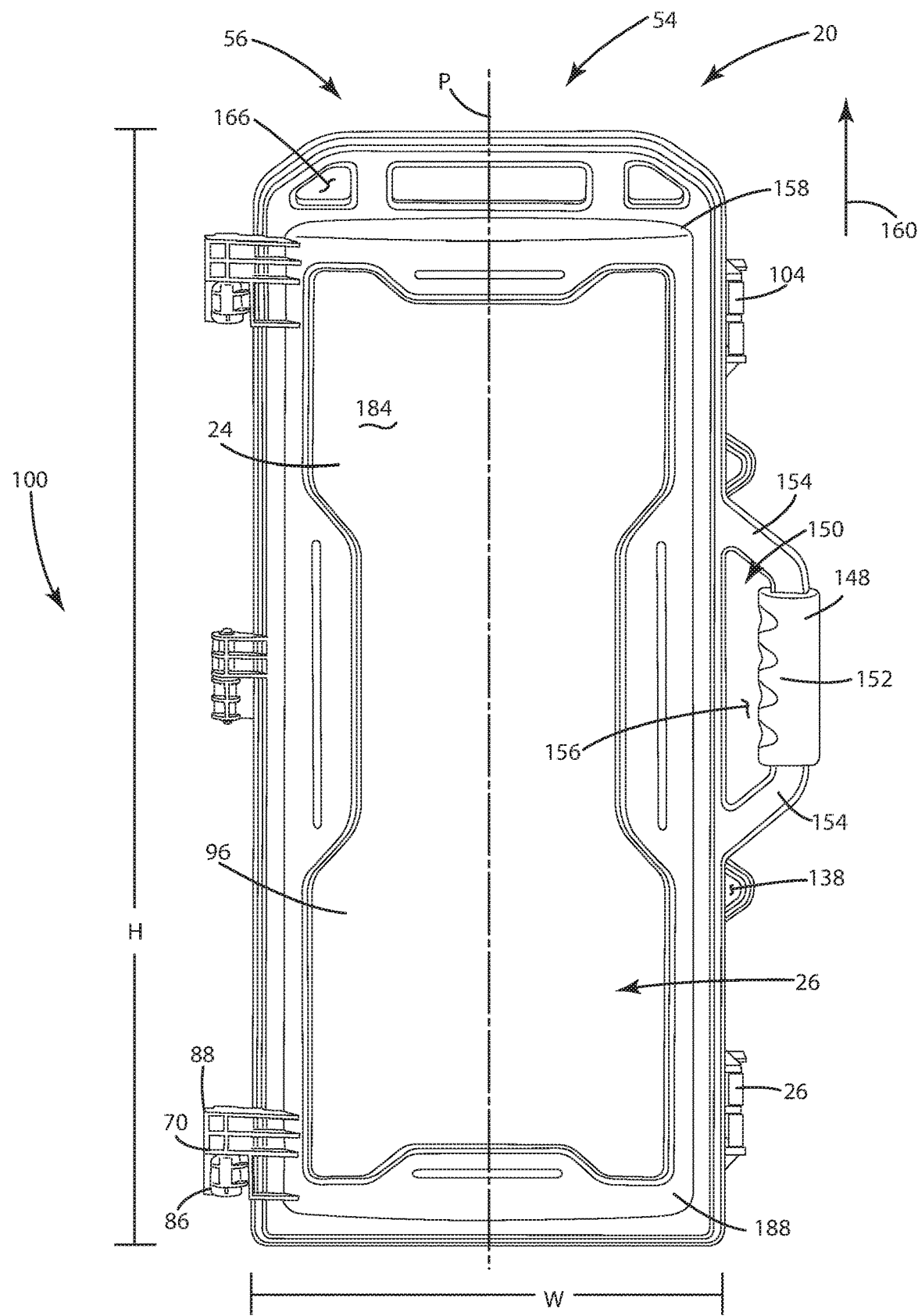
FIG. 10 is a front view of the outdoor storage container in the closed mode.

In the closed mode 100, the outdoor storage container 20 can include a height H, a width W, and a depth D, as depicted in FIGS. 10 and 11. The height H can be optionally between 2 feet and 4 feet, between 3 and 5 feet, or between 3.5 and 4.5 feet. The width W is optionally between 1 foot and 3 feet, between 1.5 feet and 3 feet, or between 2 feet and 3 feet. The depth D is optionally between 3 inches and 12 inches, between 5 inches and 10 inches, or between 6 inches and 12 inches. The outdoor storage container 20 can include an average wall thickness T, as illustrated in FIG. 5. The average thickness T can be defined by walls of the housing 22 (e.g., the upper wall 38, the lower wall 40, the first sidewall 42, the second sidewall 44, and the rear wall 46) and the closure panel 24 (e.g., the front wall 96). The average thickness T is optionally from $\frac{1}{32}$ inch to $\frac{1}{4}$ inch, from $\frac{1}{16}$ inch to $\frac{1}{4}$ inch, or from $\frac{1}{16}$ inch to $\frac{1}{8}$ inch.

The first latch 26 can be disposed on the second side portion 56 and outward from at least one of the first sealing flange 48 and the second sealing flange 98. The first latch 26 spans between the housing 22 and the closure panel 24 and is configured to secure the closure panel 24 to the housing 22 in a closed mode 100 and to compress the seal 102 between the first sealing flange 48 and the second sealing flange 98 in the closed mode 100. In various embodiments, the outdoor storage container can include multiple latches including the first latch 26 and a second latch 104. In various embodiments the latches 26, 104 are of a folding or pivoting type. The latches 26, 104 can be effortlessly and quietly engaged and disengaged to latch the closure panel 23 in a closed mode 100, or to open the closure panel 24 to the open mode 72.

The storage container 20 can include a first retention strap holder 28 disposed on the first side portion 54 and a second retention strap holder 106 disposed on the second side portion 56. The first retention strap holder 28 and the second retention strap holder 106 can be joined with at least one of the rear wall 46, the first side wall 42, and the second side wall 44. A retention strap 108 can extend from the first retention strap holder 28 to the second retention strap holder 106 and is configured to extend around the generally vertical support 60, as depicted in FIGS. 1 and 3, to hold the first outwardly extending leg 50 and the second outwardly extending leg 52 against the generally vertical support 60 and cause the housing 22 to be supported at an elevation 110 above ground level 111. The elevation 110 can be that elevation at which treestands or elevated platforms 112 are typically mounted by hunters; for example, between 10 ft and 25 ft, between 15 and 20 feet, or between 17 and 20 feet.

The retention strap 108 can be manufactured of a textile material including natural (e.g., cotton) or synthetic (e.g., nylon or polyester) materials or various combinations thereof. The retention strap 108 can be treated to be rendered resistant to microbial growth (e.g., fungi) thereupon or fouling through a surface treatment. The retention strap 108 may also be manufactured of leather or other animal-hide derivatives, metals, alloys, various nonwoven polymeric materials, or various combinations thereof. The retention strap 108 can include a buckle 113. The retention strap can also include any of various elements for mechanically tightening the retention strap 108 around the generally vertical support 60; for example, a ratchet mechanism, an elastomeric component capable of being stretched, a flip-tight mechanism, a buckle 113 (e.g., a double-backed buckle), or a slide adjuster. In various embodiments, the retention strap 108 has a width 114 equal to about 1 inch to about 3 inches, from about 1 inch to about 2 inches, or from about 0.5 inches to about 1.5 inches.

The storage insert 30 can be disposed in the internal compartment 36 and can include multiple pockets 116, dividers, or other similar organizational means. Each pocket 116 includes an upward facing opening 118. Each pocket 116 can be configured to store an item 120 in the pocket 116 in a generally upright, vertical 122 configuration. In some embodiments, the storage insert 30 can define openings 124 capable of being engaged by securement posts 126 extending from the rear wall 46 and into the internal compartment 36. Certain securement posts 126 can be inserted through the openings 124 and the securement posts 126 may be secured within the openings by a fastener 128, optionally including an end portion 130 having an external diameter greater than a diameter of the openings 124. In some embodiments, the fastener 128 is ring-shaped and can be secured around a securement post 126 (e.g., by an interference fit). The storage insert 30 can include a noise reduction coating, such as a rubber or foam coating to reduce noise between stowed items 120 (alternatively referred to as "gear") and the housing 22. The pockets 116 can comprise a mesh or transparent polymer window allowing for items 120 within the pockets 116 to be readily observed and discerned without having to remove items 120 from the pockets 116. In some embodiments, the storage insert 30 includes pockets 116 having at least two different dimensionalities, such as large and small.

The storage container 20 can include one or more cable flanges 32 that extend from at least one of the closure panel 24 and the housing 22, as shown in FIG. 3. A cable flange 32 can be joined with at least one of the rear wall 46, the first side wall 42, and the second side wall 44. The cable flange 32 optionally can be a loop, as shown in FIG. 3. The cable flange 32 defines a cable aperture 132 to receive a cable 134 therethrough such that the cable 134 can extend around the generally vertical support 60, as shown in FIG. 3. The cable 134 includes a cable lock 136. The cable lock 136 may be a mechanical (e.g., lock-and-key lock or combination lock) or an electrical lock (e.g., a BLUETOOTH lock or an electrical combination lock). In various embodiments, the cable 134 is manufactured of a material of sufficient strength to be effective as an anti-theft device (e.g., of hardened steel, max performance steel or titanium).

The storage container 20 can include a lock flange 34 that extends from at least one of the closure panel 24 and the housing 22, as shown in FIG. 3. The lock flange 34 can define a lock aperture 138 sized to receive a lock 140 therethrough so that the closure panel 24 can be locked closed relative to the housing 22 in the closed mode 100. The lock 140 may be a mechanical (e.g., lock-and-key lock or combination lock) or an electrical lock (e.g., a BLUETOOTH lock or an electrical combination lock). In various embodiments, the lock 140 is manufactured of a material of sufficient strength to be effective as an anti-theft device (e.g., of hardened steel, max performance steel, or titanium).

The outdoor storage container 20 can include a mobility strap or pack flange 41 extending from at least one of the closure panel 24 and the housing 22. The pack flange 41 is joined with at least one of the rear wall 46, the first side wall 42, and the second side wall 44. The pack flange 41 defines a pack strap aperture 41A sized to receive a pack strap or any type of mobility or carry strap therethrough so that the pack strap can be configured to engage at least one of a wearer's shoulders or other appendages and support the storage container 20 therefrom so that the storage container 20 can be carried to a particular generally vertical support 60.

The outdoor storage container 20 can include a handle 148 integrally formed hinged/folded with and extending from at least one of the closure panel 24 and the housing 22. Alternatively, the handle can be hinged or foldingly attached at a pivot connection to the panel and/or housing. The handle 148 can define a hand aperture 150 through which a hand can be placed. The handle 148 includes a grip surface 152 adjacent the hand aperture 150 and opposing connection supports 154 projecting from at least one of a closure panel 24 and the housing 22. Optionally, the grip surface 152 can include a surface treated to enhance frictional engagement with a user's hand or the grip surface 152 is manufactured of a material facilitating frictional engagement with a user's hand. The grip surface 152 can include an ergonomic shape facilitating grasping of the handle 148 by a user's hand. For example, the grip surface 152 may include indentations 156 within which a user's fingers may be placed. In various embodiments, the grip surface 152 is manufactured of a material, such as a rubber, leather, or a foam, that helps facilitate a comfortable grip when a user grasps the handle 148. In some embodiments, the grip surface 152 is textured to facilitate comfortable frictional engagement with a hand. The handle 148 can include an ergonomic shape (e.g., a cylindrical shape). The handle 148 can extend from the second side portion 56 and is located about midway between the first latch 26 and the second latch 104 adjacent the second side portion 56. The handle 148 can be centered along an axis of the outdoor storage container 20. The handle 148 can include two halves where one half is secured to the housing 22 and the other half is secured to the closure panel 24 such that a full handle 148 is defined by the outdoor storage container 20 only in the closed mode 100. Optionally, the handle can include an anti-pinch flange.

Figure 8:
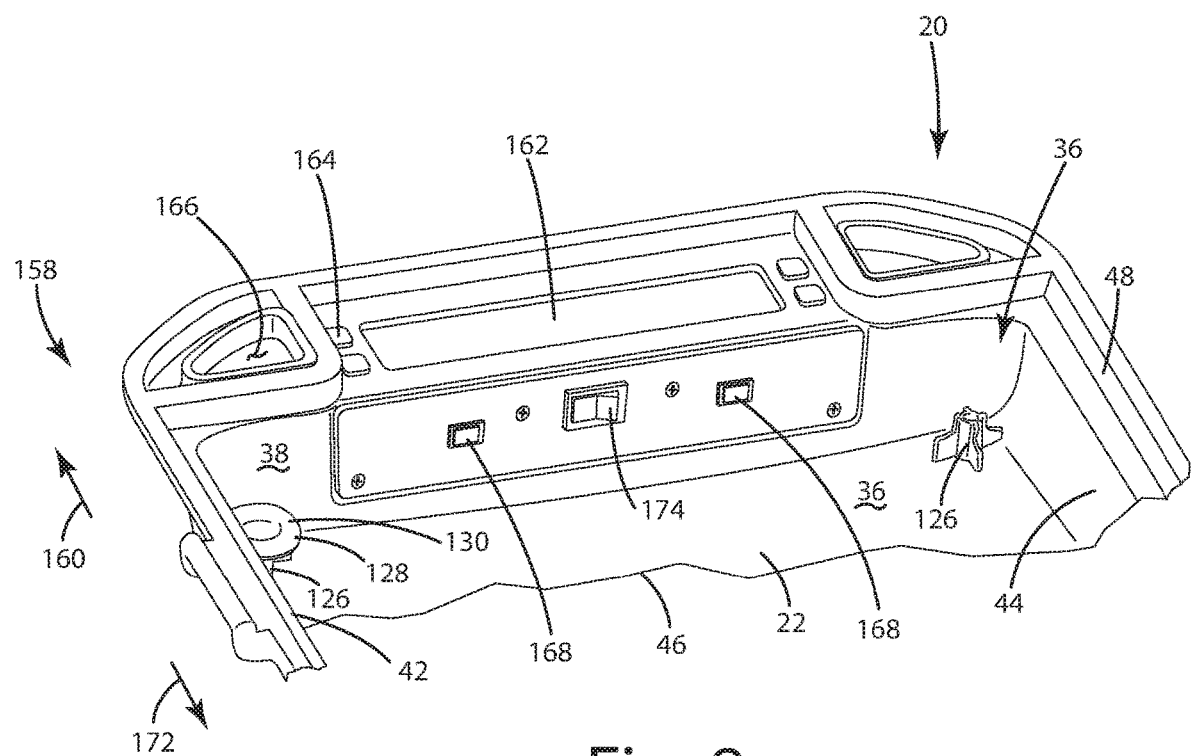
FIG. 8 is a perspective view of an upper portion of the outdoor storage container.

As shown in FIG. 8, the upper wall 38 of the outdoor storage container 20 includes an upper portion 158 that projects above (see arrow 160 indicating the "above" direction) the closure panel 24. A display 162 is mounted to the upper portion 158. The display 162 is configured to display at least one of time, temperature, wind direction, and barometric pressure to a user while the outdoor storage container 20 is in the closed mode 100 and/or the open mode 72. Optionally, the display 162 can interface (e.g., by a wireless connection such as BLUETOOTH, or by a corded connection such as a USB cord) with a smart device (e.g., a tablet or smart phone) to enable a user 74 to quietly view information from the smart device without extra movement necessary to retrieve the device. The display 162 may be controlled via a touch screen and/or through the use of buttons 164. The display 162 can display text messages or a caller ID for an incoming communication. The display can be in communication with a power source; for example, rechargeable batteries (e.g., lithium ion batteries), non-rechargeable batteries, solar power, a hand-operated generator, or a combination thereof.

In some embodiments the display 162 includes a backlight. The backlight can be of a certain wavelength (alternatively "color") so as not to spook game (e.g., a green or red wavelength in the visible spectrum). In various embodiments, the outwardly extending legs 50, 52, 61, 62 are disposed below the display 162.

The display 162 can be joined with the housing 22 and can be visible adjacent at least one of the upper wall 38, the lower wall 40, the first side wall 42, and the second side wall 44. The display 162 can be disposed outside the internal compartment 36 and within, or alternatively, beyond the first sealing flange 48, the second sealing flange 98, and the seal 102.

Optionally, the outdoor storage container 20 includes lift rope openings 166 that can accommodate a lift rope to enable a user to pull the container up onto an elevated platform 112. The lift rope openings 166 can be adjacent the display 162. Alternatively, the lift rope openings can be associated with other parts of the container in other locations. Generally, the lift rope openings can be sized so that a rope, cord, wire, or other elongated element, all referred to as a rope, can be placed through the rope opening and optionally tied to itself or the container or portions thereof to secure the lift rope to the container such that the rope can be used to hoist and/or lift the container from a first elevation to a second elevation that is higher than the first elevation.

Figure 9:
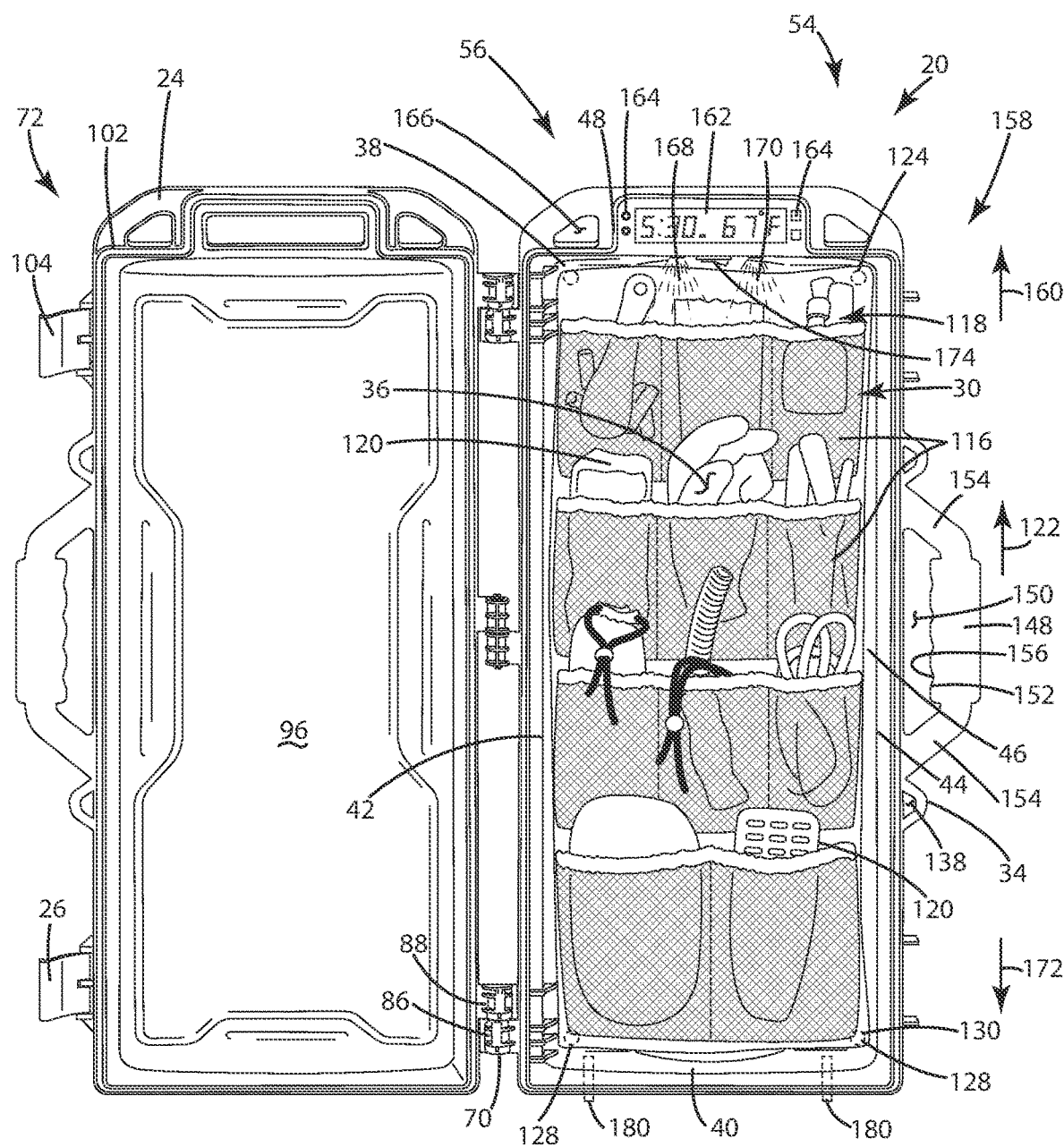
FIG. 9 is a front view of the outdoor storage container in the open mode with an illumination source emitting illumination and where a storage insert has been installed in an internal compartment.

As shown in FIG. 8, in some embodiments, the outdoor storage container can include an illumination source 168. The illumination source 168 can be in communication with the internal compartment 36 so as to project illumination 170 into the internal compartment 36, as shown in FIG. 9, downward (see arrow 172) toward the plurality of pockets 116 of the storage insert 30. The illumination 170 can be of a certain wavelength (e.g., green or red on the visible spectrum) so as not to spook game. The illumination source 168 can be powered by rechargeable batteries (e.g., lithium ion batteries), non-rechargeable batteries, solar power, a hand-operated generator, an external power source, or a combination thereof. In some embodiments, the illumination source 168 can include light emitting diodes (LEDs). The illumination source 168 can be controlled by an on-off switch 174 or the illumination source 168 can detect ambient lighting conditions and automatically turn on under low lighting conditions (e.g., night or overcast conditions) when the outdoor storage container 20 is opened. The illumination source 168 can turn off automatically under adequate ambient lighting (e.g., daytime sunny conditions) conditions and/or when the storage container 20 is in the closed mode 100.

As shown in FIG. 3, the outdoor storage container 20 can include an arrow 176 gripper 178 or bolt gripper 178. The gripper 178 can hold a single bolt or arrow 176 for a quick one-handed retrieval of the same for a follow-up on game. In various embodiments, the gripper 178 extends from the housing 22, the closure panel 24, the rear wall 46, and/or a leg 50, 52, 61, 62. The gripper 178 can extend from one or more of the legs 50, 52, 61, 62 of the outdoor storage container 20. In some embodiments, the gripper 178 comprises a gripper 178 extending from two legs where one leg is disposed above the other leg, as shown in FIG. 3; for example, the gripper 178 may extend from a surface of the first outwardly extending leg 50 and the third outwardly extending leg 61 so that an arrow 176 secured within the gripper 178 may be readily accessed by a hunter 74.

In some embodiments, as depicted in FIGS. 3, 4 and 9, the storage container 20 can include stabilization legs 180 extending from the housing 22 or the closure panel 24. The stabilization legs 180 can extend from one or a plurality of sides of the housing 22 or the closure panel 24. For example, the stabilization legs 180 may extend from the lower wall 40, the first sidewall 42, or the second sidewall 44. The stabilization legs 180 allow for the storage container 20 to be stably maintained in an erect configuration supported by the stabilization legs 174. For example, the stabilization legs 174 may allow the storage container 20 to be stably maintained in a vertical configuration.

The outdoor storage container 20 can include a pressure relief valve 182 to prevent pressure build-up within the internal compartment 36. The pressure relief valve 182 can be disposed in the rear wall 46, optionally within a wall of one of the legs 50, 52, 61, 62 extending from the rear wall 46. In some cases, the pressure relief valve can be hidden or obscured at least partially, or protected by portions of the legs. Further optionally, the pressure relief valve can be disposed in other walls of the container, such as the sidewalls, the top or bottom walls or even the closure panel in some cases.

Generally, the pressure relief valve can extend from the internal compartment to the exterior of the container and/or the ambient environment around the container. The pressure relief valve can be configured to open at a predetermined pressure inside the container and allow air or fluid to be expelled from the internal compartment to the environment. For example, the pressure relief valve can be configured to open at optionally a pressure inside the internal compartment above standard sea level pressure, that is, above at least 760 mm Hg, or above at least 770 mm Hg, or above at least 780 mm Hg, or other pressures depending on the application. It will be noted that the pressure inside the internal compartment can increase due to heating of the container, for example, by the sun heating the container. Where the container is sealed between the closure panel and the housing, heat from the sun can increase the pressure in the internal compartment which can eventually compromise a seal of the container such that the seal may no longer work to keep water out of the internal compartment. Even further optionally, the pressure relief valve can include a conduit extending from the internal compartment to the exterior of the container. The conduit can include a flexible membrane therein or other movable element therein. The membrane or element can flex or move away from an aperture or a portion of the conduit when pressure inside internal compartment exceeds a predetermined pressure, thereby allowing the fluid or air inside the internal compartment to escape and reduce the pressure inside the internal compartment. Other types of pressure relief valves are contemplated, such as duck bill pressure relief valves, spring-loaded pressure relief valves and/or piston type pressure relief valves.

In various embodiments, an exterior of the outdoor storage container 20 can be camouflaged or patterned to blend into a surrounding environment. For example, an exterior surface 184 of the closure panel 24 can include an internal area 186 printed, painted, or patterned to resemble the bark of a tree and a perimeter area 188 printed with a camouflage pattern. In some embodiments, an outer surface 190 of the housing 22 is similarly printed, painted, or patterned to blend into a surrounding environment (e.g., a tree trunk in a forest). In various embodiments, a surface of the outdoor storage container 20 includes an a sticker adhered thereto by an adhesive where the sticker includes a surface printed with a pattern or image.

The storage container 20 can be used to store hunting, fishing, and general sporting equipment long-term (e.g., days or weeks) or short-term (e.g., hours).

Optionally, the internal compartment 36 can be void of any image capture device (e.g., a camera, or a video recorder or other related items permanently mounted in the storage container 20). In various embodiments, the outdoor storage container 20 can be free of any device for capturing images and also is not configured to interface with any image capturing device. The outdoor storage container 20 can be free of any memory chip or other device intended for storing images captured by an image capture device.

Figure 2:
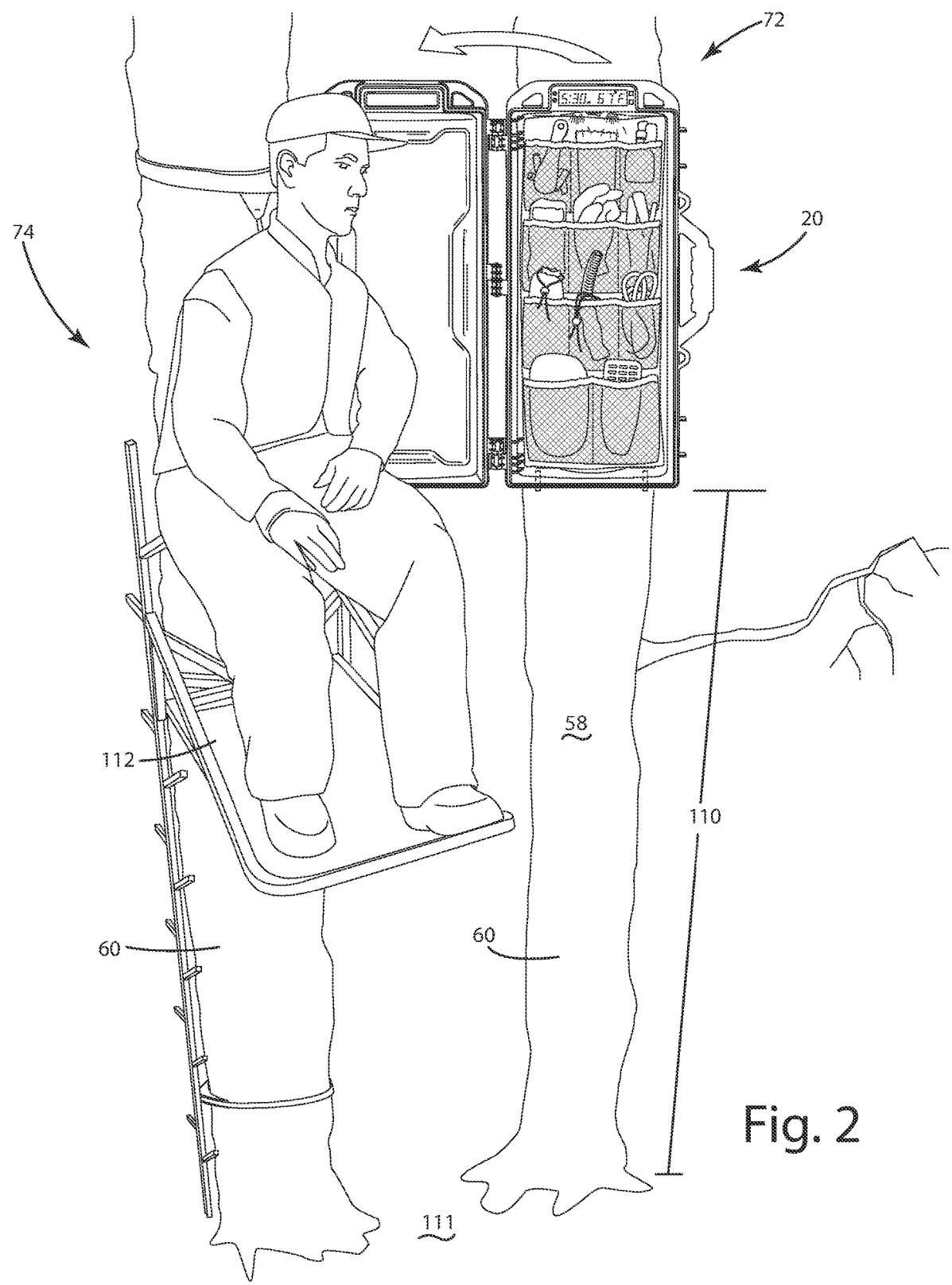
FIG. 2 is an environmental view of the outdoor storage container in an open mode.

In various embodiments, as depicted in FIGS. 1 and 2, the outdoor storage container 20 can be used in combination with an elevated platform 112 (optionally a treestand) so that a hunter 74 may readily access the storage container 20 from the elevated platform 112. The outdoor storage container 20 may be mounted to the same generally vertical support 60 as the elevated platform 112 or the outdoor storage container 20 may be mounted to a generally vertical support 60 adjacent to that to which the elevated platform 112 is mounted. In FIGS. 1 and 2 the generally vertical supports 60 are depicted as two trees, however, in some embodiments the generally vertical supports 60 may represent two trunks of a single tree. The outdoor storage container 20 may be mounted to the same generally vertical support 60 as the elevated platform 112, in which case the outdoor storage container 20 is so positioned upon the generally vertical support 60 as to be readily and conveniently accessible by the hunter 74 while the hunter 74 is on the elevated platform 112. The outdoor storage container 20 is generally not positioned to impact a hunter's back when the hunter 74 is in the elevated platform 112. The outdoor storage container 20 can be positioned on a side of the generally vertical support 60 that is generally perpendicular to a side to which the elevated platform 112 is positioned.

A method for securing the outdoor storage container 20 to the generally vertical support 60 includes positioning the outdoor storage container 20 at a desired elevation 110 along the generally vertical support 60. The method further includes wrapping the retention strap 90 around the generally vertical support 60, as shown in FIGS. 1 and 3, and tightening the strap 90. The method also includes wrapping the cable 134 around the generally vertical support 60 and locking the cable lock 136. The method can further include locking the storage container 20 while in a closed mode 100 by using the lock 140 in combination with the lock aperture 138.

The various elements of the components of the outdoor storage container 20 described above, e.g. the housing 22, the closure panel 24, the legs 50, 52, 61, 62, the storage insert 30, and the seal 102, may be manufactured from, and thus ultimately comprise, the same or different material(s), such as any one or more of the materials described below. Moreover, each element may itself comprise a combination of different materials, and thus may not comprise a homogeneous composition throughout. In certain embodiments, one or more of the components of the outdoor storage container 20 (e.g. the housing 22, the closure panel 24, the legs 50, 52, 61, 62, the storage insert 30, and the seal 102, etc.) is monolithic in construction.

In general, materials suitable for use in or as the outdoor storage container 20 or various components thereof include metals (e.g. steels, aluminums, alloys, etc.), resins (e.g. thermoset and/or thermoplastic resins), rubbers/elastomers, and combinations thereof. However, myriad materials may be used to manufacture elements of the outdoor storage container 20, each typically selected as a function of availability, cost, performance/end use applications, etc. Moreover, metals, metal alloys, rubbers/elastomers, and resins are not exhaustive of suitable materials that may be used.

In general, the outdoor storage container 20 comprises a rigid polymer. Rigid polymers optionally may be defined as those polymers having a durometer corresponding to between 0 and 100 on the Shore D hardness scale, optionally between 30 and 80, optionally between 75 and 90, and further optionally between 90 and 100. In some embodiments, various components of the outdoor storage container 20 are manufactured of materials having a durometer of between 40 and 100, 50 and 75, between 80 and 90, or between 90 and 100 on the Shore 00 hardness scale. In some embodiments the seal 102 is manufactured of a material having a lower durometer than the housing 22 and/or the closure panel 24.

A polymeric material from which a component of the storage container 20 is constructed can include a UV stabilizer. Non-limiting examples of suitable UV stabilizers include ultraviolet absorbers (e.g., carbon black, titanium dioxide, hydroxybenzophenone, oxanilides, benzophenones, benzotriazoles, and hydroxyphenyltriazines), quenchers (e.g., nickel quenchers), and hindered amine light stabilizers, and various combinations thereof. The polymeric material may be selected to be inherently UV stable (e.g., fluorinated polymers or acrylic). In some embodiments, the storage container 20 includes a UV protective coating.

In certain embodiments, the outdoor storage container 20 comprises a resin, such as a thermoplastic and/or thermoset resin. In such embodiments, the various elements of the components of the outdoor storage container 20 described above, e.g. the housing 22, the closure panel 24, the legs 50, 52, 61, 62, and the seal 102, may each independently comprise an independently selected resin. Examples of suitable resins typically comprise the reaction product of a monomer and a curing agent, although resins formed of self-polymerizing monomers (i.e., those acting as both a monomer and a curing agent) may also be utilized. It is to be appreciated that such resins are conventionally named/identified according to a particular functional group present in the reaction product. For example, the term "polyurethane resin" represents a polymeric compound comprising a reaction product of an isocyanate (i.e., a monomer) and a polyol (i.e., a chain extender/curing agent). The reaction of the isocyanate and the polyol create urethane functional groups, which were not present in either of the unreacted monomer or curing agent. However, it is also to be appreciated that, in certain instances, resins are named according to a particular functional group present in the monomer (i.e., a cure site). For example, the term "epoxy resin" represents a polymeric compound comprising a cross-linked reaction product of a monomer having one or more epoxide groups (i.e., an epoxide) and a curing agent. However, once cured, the epoxy resin is no longer an epoxy, or no longer includes epoxide groups, but for any unreacted or residual epoxide groups (i.e., cure sites), which may remain after curing, as understood in the art. In other instances, however, resins may be named according to a functional group present in both the monomer and the reaction product (i.e., an unreacted functional group).

In some embodiments, the outdoor storage container 20 comprises a synthetic or natural rubber or polyamide. As a non-limiting example, in some embodiments, the seal 102 comprises an ethylene-propylene rubber or a thermoplastic polyolefin. In some embodiments, the seal 102 has a lower durometer than the housing 22 or the closure panel 24.

FIGS. 12-16 illustrate a slightly different configuration of the storage container 200, with its various aesthetic features.

With regard to composition of the particular components described above comprising a resin, examples of suitable resins include thermoset resins and thermoplastic resins. Examples of suitable thermoset resins and/or thermoplastic resins typically include polyamides (PA), such as Nylons; polyesters such as polyethylene terephthalates (PET), polybutylene terephthalates (PET), polytrimethylene terephthalates (PTT), polyethylene naphthalates (PEN), liquid crystalline polyesters, and the like; polyolefins such as polyethylenes (PE), polypropylenes (PP), polybutylenes, and the like; styrenic resins; polyoxymethylenes (POM); polycarbonates (PC); polymethylenemethacrylates (PMMA); polyvinyl chlorides (PVC); polyphenylene sulfides (PPS); polyphenylene ethers (PPE); polyimides (PI); polyamideimides (PAI); polyetherimides (PEI); polysulfones (PSU); polyethersulfones; polyketones (PK); polyetherketones (PEK); polyetheretherketones (PEEK); polyetherketoneketones (PEKK); polyarylates (PAR); polyethernitriles (PEN); resol-type; urea (e.g. melamine-type); phenoxy resins; fluorinated resins, such as polytetrafluoroethylenes; thermoplastic elastomers, such as polystyrene types, polyolefin types, polyurethane types, polyester types, polyamide types, polybutadiene types, polyisoprene types, fluoro types, and the like; and copolymers, modifications, and combinations thereof. Other exemplary materials can be Acrylonitrile Butadiene Styrene (ABS), ABS plus PC, and/or Acrylonitrile Styrene Acrylate (ASA).

With regard to composition of the particular components described above comprising a rubber/elastomer, examples of suitable rubber/elastomers include neoprene rubbers, buna-N rubbers, silicone rubbers, ethylene propylene diene monomer (EPDM) rubbers, natural gum rubbers, viton rubbers, natural latex rubbers, vinyl rubbers, santoprene rubbers, epichlorohydrin (ECH) rubbers, butyl rubbers, latex-free thermoplastic elastomer (TPEs), thermoplastic elastomers, hypalon rubbers, ethylene propylene rubbers, fluroelastomer rubbers, fluorosilicone rubbers, hydrogenated nitrile rubbers, nitrile rubbers, perfluoroelastomer rubbers, polyacrylic rubbers, polychloroprenes, polyurethanes, aflas rubbers, chlorosulfonated polyethelene rubbers, styrene butadiene rubbers (SBRs), polyacrylates, ethylene acrylic rubbers, polyvinyl chloride (PVC), ethylene-vinyl acetate (EVA), and combinations thereof.

In various embodiments, any of the components of the outdoor storage container 20 described above may comprise a material (e.g. a resin, rubber, etc.) including a filler. Examples of suitable fillers include reinforcing fillers added for providing mechanical strength, such as inorganic fillers (e.g. fumed silica fine powder, precipitated silica fine powder, fused silica fined powder, baked silica fine powder, fumed titanium dioxide fine powder, quartz fine powder, calcium carbonate fine powder, diatomaceous earth fine powder, aluminum oxide fine powder, aluminum hydroxide powder, zinc oxide fine powder, zinc carbonate fine powder, glass fibers, etc.), organic fibers (e.g. carbon fibers), natural fibers, and the like, as well as combinations thereof. In some embodiments, at least one component of the outdoor storage container 20 comprises a fiberglass.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

In addition, when a component, part or layer is referred to as being "joined with," "on," "engaged with," "adhered to," "secured to," or "coupled to" another component, part or layer, it may be directly joined with, on, engaged with, adhered to, secured to, or coupled to the other component, part or layer, or any number of intervening components, parts or layers may be present. In contrast, when an element is referred to as being "directly joined with," "directly on," "directly engaged with," "directly adhered to," "directly secured to," or "directly coupled to" another element or layer, there may be no intervening elements or layers present. Other words used to describe the relationship between components, layers and parts should be interpreted in a like manner, such as "adjacent" versus "directly adjacent" and similar words. As used herein, the term "and/or" includes any and all combinations of one or more of the associated listed items.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The embodiments of the invention in which an exclusive property or privilege is claimed are defined as follows:

1. An outdoor storage container comprising:
   a housing constructed from a rigid polymeric material, the housing including an internal compartment bounded by a upper wall, a lower wall, first and second side walls, and a rear wall, the upper wall, lower wall, first and second walls all joined with a first sealing flange that extends around the internal compartment, the rear wall including a first outwardly extending leg and a second outwardly extending leg disposed on opposite sides of a bisecting plane that divides the housing into first and second side portions, the first and second outwardly extending legs each configured to engage an exterior of a generally vertical support and to selectively hold the rear wall a distance away from the generally vertical support;
   a closure panel secured to the housing with a first hinge disposed on the first side portion, the closure panel constructed from the rigid polymeric material, the closure panel including a front wall and a second sealing flange configured to be placed adjacent the first sealing flange when the closure panel is in a closed mode, with a seal interposed between the first sealing flange and the second sealing flange in the closed mode;
   a first latch disposed on the second side portion and outward from at least one of the first and second sealing flanges, the first latch spanning between the housing and the closure panel and configured to secure the closure panel to the housing in a closed mode and to compress the seal between the first sealing flange and the second sealing flange in the closed mode;
   a first retention strap holder on the first side portion and a second retention strap holder on the second side portion with a retention strap extending from the first holder to the second holder and configured to extend around the generally vertical support to hold the first and second legs against the generally vertical support, and supporting the housing at an elevation above a ground level;
   a storage insert disposed in the internal compartment and comprising a plurality of pockets, each with an upward facing opening and each configured to store an item placed in the pockets;
   a cable flange extending from at least one of the closure panel and the housing, the cable flange defining a cable aperture sized to receive a cable therethrough such that the cable can extend around the generally vertical support;
   a lock flange extending from at least one of the closure panel and the housing, the lock flange defining a lock aperture sized to receive a lock therethrough so that the closure panel can be locked closed relative to the housing in the closed mode;
   a handle extending from at least one of the closure panel and the housing, the handle defining a hand aperture through which a hand can be placed, a grip surface adjacent the hand aperture, and a connection support projecting from the at least one of a closure panel and the housing, the handle extending from the second side portion;
   an illumination source in communication with the internal compartment so as to project illumination into the internal compartment, toward the plurality of pockets of the storage insert; and
   a display joined with the housing and visible adjacent at least one of the upper wall, the lower wall and the first and second side walls, the display in communication with a power source and configured to display at least one of time, temperature, wind direction and barometric pressure to a user; and
   a hold open element joined with the closure panel that urges the closure panel to an open mode, such that the insert is accessible by a user, the hold open element being at least one of a torque element, a biasing element, and a magnetic element,
   wherein the internal compartment is void of an image capturing device,
   wherein the closure panel defines a display aperture,
   wherein the display is viewable through the display aperture in the closed mode,
   wherein the display is viewable adjacent the internal compartment and plurality of pockets in the open mode, in which the aperture and closure panel are distal from the display,
   wherein the display includes a light, the light illuminating at least one of the display and the internal compartment.

2. The storage container of claim 1 comprising:
   a pack flange extending from at least one of the closure panel and the housing, the pack flange defining a pack strap aperture sized to receive a pack strap therethrough so that the pack strap can be configured to engage a wearer and support the storage container therefrom so that the storage container can be carried to a particular site.

3. The storage container of claim 2 comprising:
a third outwardly extending leg and a fourth outwardly extending leg, both extending from the rear wall and disposed on opposite sides of the bisecting plane, the third and fourth outwardly extending legs each configured to engage an exterior of the generally vertical support and to selectively hold the rear wall a distance away from the generally vertical support, the third outwardly extending leg located below the first outwardly extending leg and the display, the fourth outwardly extending leg located below the second outwardly extending leg and the display.

4. The storage container of claim 1,
wherein each pocket is constructed from a mesh so that the item can be viewed in the pocket through the mesh,
wherein each pocket included an elastic top to impair the item from exiting the pocket despite an orientation of the pocket.

\* \* \* \* \*